United States Patent [19]

Jayawant

[11] 4,072,110

[45] Feb. 7, 1978

[54] ELECTROMAGNETIC SUSPENSION ASSEMBLY

[75] Inventor: Bhalchandra Vinayak Jayawant, Kingston, near Lewes, England

[73] Assignee: The University of Sussex, Sussex, England

[21] Appl. No.: 720,447

[22] Filed: Sept. 3, 1976

[30] Foreign Application Priority Data

Sept. 5, 1975 United Kingdom ............... 36652/75

[51] Int. Cl.² .............................................. B61B 13/08
[52] U.S. Cl. .............................. 104/148 MS; 104/130
[58] Field of Search ................. 104/148 LM, 148 MS, 104/130

[56] References Cited

U.S. PATENT DOCUMENTS

| | | | |
|---|---|---|---|
| 3,559,583 | 2/1971 | Chadenson | 104/148 MS X |
| 3,797,403 | 3/1974 | Schwarzler et al. | 104/148 MS |
| 3,804,022 | 4/1974 | Schwarzler et al. | 104/148 MS |
| 3,842,747 | 10/1974 | Schwarzler | 104/148 MS |
| 3,849,724 | 11/1974 | Ghibu et al. | 104/148 MS X |
| 3,968,753 | 7/1976 | Breitling | 104/148 MS |

Primary Examiner—Barry L. Kelmachter
Attorney, Agent, or Firm—Fitzpatrick, Cella, Harper & Scinto

[57] ABSTRACT

An electromagnetic suspension system for a vehicle has an electromagnet with an upright portion having a lift magnetising winding and outwardly-extending arms at the top and bottom of this upright portion. Pole pieces on the four arms co-operate with reaction rails having corresponding surfaces. The vehicle can operate with a left-hand or a right-hand reaction rail or with both rails, thereby enabling gaps to be provided in rails at track junctions. Lateral guidance windings are provided on the lower arms of the magnet and the lower pole faces slope to the horizontal, in the lateral direction of the track so that, at a track junction, by emergising appropriate windings, the vehicle is guided to a selected track. The lower arms are longer than the upper arms to give, as a result of the leakage flux, lateral damping.

8 Claims, 7 Drawing Figures

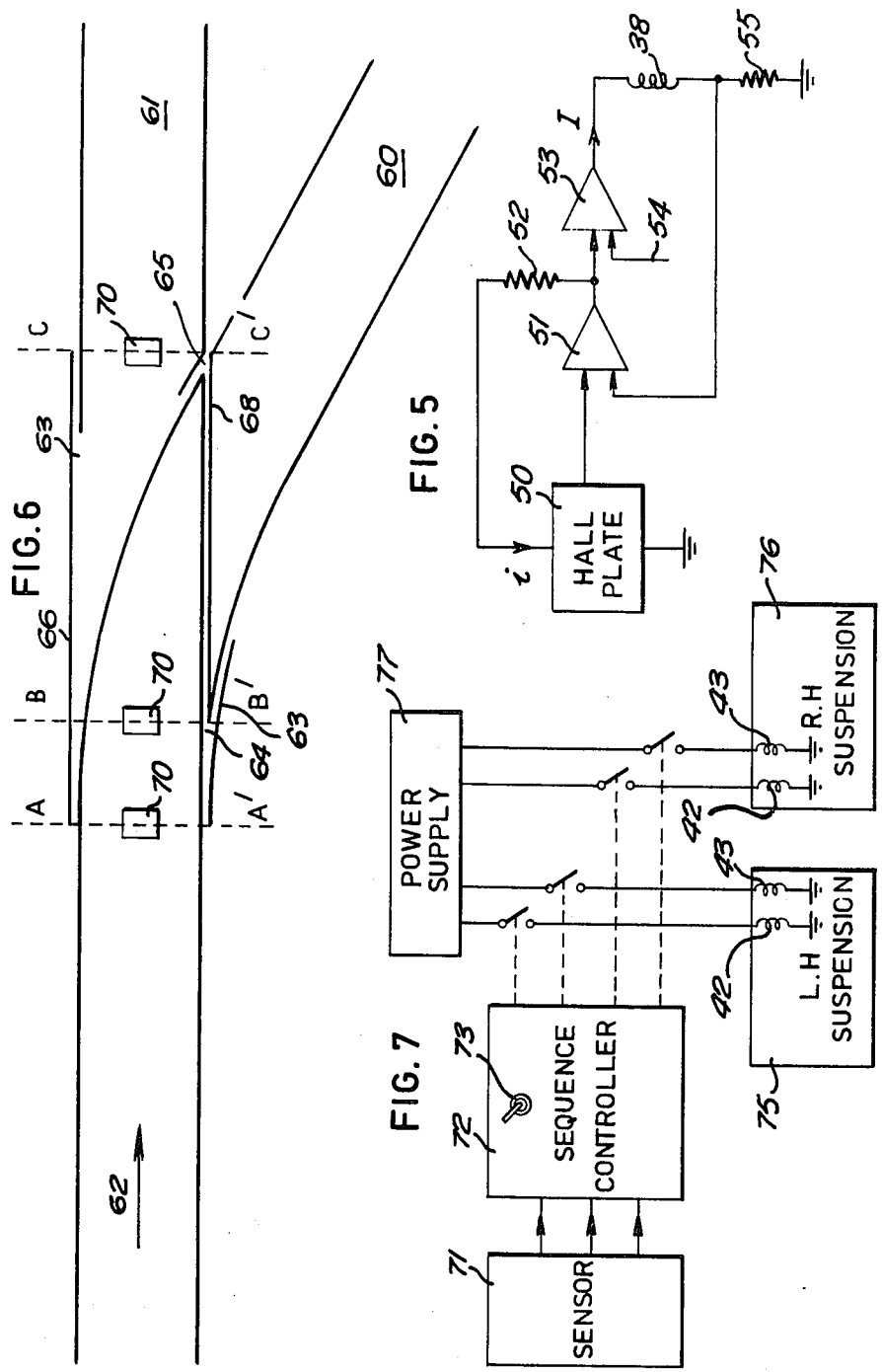

ELECTROMAGNETIC SUSPENSION ASSEMBLY

BACKGROUND OF THE INVENTION

1. Field of the Invention

This invention relates to electromagnetic suspension assemblies for vehicles to be levitated by magnetic attraction. The present invention is concerned more particularly with the lateral guidance of vehicles.

2. Prior Art

Lateral guidance of magnetically suspended vehicles presents problems because, at a track junction, it is necessary to have gaps in the reaction rails. The magnetic suspension system has to enable the vehicle to pass across such gaps without sudden changes in the lift force. Track switching systems for such vehicles have been described, for example, in British Pat. Specifications Nos. 1389459 and 1409764 but these arrangements require energised electromagnets on the track.

SUMMARY OF THE INVENTION

It is one object of the present invention to provide a magnetic suspension system for a vehicle in which lateral electromagnetic windings are provided on the vehicle so as to be controllable from the vehicle, thereby permitting route selection at a track junction by the driver of the vehicle.

According to one aspect of this invention an electromagnetic suspension system for a vehicle to be levitated by magnetic attraction comprises an electromagnetic core on the vehicle having an upright portion with outwardly extending arms at its top and bottom ends, the ends of said arms forming pole faces, and, for supporting the vehicle, a ferro-magnetic reaction rail on at least one side of said core with surfaces arranged to define, with said pole faces, two air gaps at the ends of the arms on that side of the core, both air gaps providing flux in a vertical direction for a vertical support force and the lower air gap providing also a horizontal component of flux for a lateral guidance force, a main lift winding on said upright portion of the core, lateral guidance windings on both the lower arms of the core, means for energising said main lift winding to support the vehicle and means for selectively energising the lateral guidance windings.

Lateral guidance by magnetic forces is required along a length of track unless other constraining means are provided for track guidance. More particularly however, at a track junction, if a driver of the vehicle is to be able to determine which of two tracks is to be taken, he must be able to control the lateral positioning of the vehicle. At a track junction, two reaction rails may be provided, one on each side of said electromagnetic core, the two reaction rails diverging along different paths and wherein means are provided for automatically controlling the energising of the lateral guidance windings, as the vehicle moves along the track, to constrain the vehicle to follow a selected path.

By the above-described arrangement, the lateral guidance forces may be controlled independently of the lift forces. For controlling the lift forces, a flux sensor, e.g. a Hall effect device, may be provided for sensing the flux in the vertical portion of the core and control means may be provided for controlling the energisation of the main winding in accordance with the sensed flux to control the lift. It is thus immaterial, from the point of view of lift, whether there are reaction rails on one or on both sides of the electromagnet core on the vehicle. The lift flux is controlled to give the required lift irrespective of whether, in track, it is divided between two reaction rails or all passes through one rail.

Conveniently the vehicle has one or more pairs of said cores, the two cores in said pair on each said pair being arranged on opposite sides of the vehicle and wherein a fixed track comprises a pair of laterally-spaced supporting rail assemblies, each co-operating with a core or the cores on one side of the vehicle. For lengths of track between junctions, the rail assemblies may comprise a left-hand rail on one side of the vehicle and a right-hand rail on the other side of the vehicle. At the track junction, each rail assembly comprises two rails, with suitable gaps for the passage of a suspension assembly on the left of the vehicle through a rail assembly on the right and vice versa.

Automatic control of the energisation of the later guidance windings may be effected by sensing means on the vehicle co-operating with elements along the length of the track to be sensed by the sensing means and indicating the required changes in lateral guidance coil energisation. Many types of sensing means may be used, e.g. electromagnetic, photo-electric or mechanical.

An important feature of the suspension system of the present invention is that it enables lateral damping to be provided. Although a magnetically suspended vehicle has a considerable restoring force if displaced, magnetic suspension systems often provide very little or no damping and hence displacement of the vehicle may lead to prolonged oscillations. The lateral guidance windings in the arrangement of the present invention, provided the lower arms of the core are made longer than the upper arms, provide damping by reason of the differential leakage flux around the pole tips on the lower arms only.

To provide lateral restoring forces, the lower pole faces may be arranged in planes extending in the direction of the rail but sloping to the horizontal and the reaction rail surfaces, for co-operating with these pole faces, may have a corresponding slope. By this arrangement, it is possible to provide lateral restoring forces with negligible loss of lift. This is on contrast to prior techniques for lateral restoration where either the pole faces are made vertical so abandoning any lift or where reliance is placed on the displacement in a horizontal plane of co-operating horizontal pole faces so reducing the net effective pole area.

With an attraction suspension system as described above it is necessary that the poles of the magnets are mounted to be below the reaction rails so that the force of attraction acts upwardly to counteract the weight of the vehicle to be suspended. Clearly, therefore, if the vehicle to be suspended is to run above the track containing the reaction rails, a mounting member has to be provided for mounting each electromagnet assembly at the bottom of the vehicle, which mounting member will extend from above the corresponding reaction rail to at least partly beneath the rail so that the electromagnet can be mounted to produce an upwardly directed attractive force to levitate the vehicle. If, on the other hand, the vehicle is to be suspended from an overhead track, then the electromagnets can be mounted at the top of the vehicle to be beneath the reaction rails. However, then, it is important to provide a further suspension member extending upwardly from each electromagnet and having at least one emergency suspension wheel mounted at an upper end thereof for engaging an upwardly directed surface of the track containing the reaction rails, so that emergency suspension of the vehicle is provided in case of failure of the magnetic levitation.

It can be seen that, whether the magnets are above or below the vehicle, it is normally necessary to have a structural member fastened to each magnet extending from above to beneath at least part of the corresponding reaction rail. Thus, in order to switch a vehicle at a track junction, breaks have to be provided in the reaction rails to allow the structural member to pass through. The breaks in the reaction rails might be long enough so that a complete magnet, or even all magnets along one side of a vehicle would have no co-operating reaction rail at some point during transit of the junction.

The electromagnetic suspension assembly may comprise a structural member arranged to extend, when the assembly is in use, from above to at least partly beneath a ferromagnetic reaction rail to which the assembly is magnetically attracted, and the electromagnet core portion with its arms is fixed to the structural member to cooperate with a ferromagnetic reaction rail on one or both sides of the core.

The structural member may be formed by the support member of the suspension assembly for a vehicle running above the track or a suspension member for emergency suspension wheels in a vehicle running beneath the track. It will be apparent that track junctions for vehicles fitted with the suspension assembly of the invention can be provided with extra reaction rail portions extending across the gaps in the normal running reaction rails so as to overlap these rails at each end of each gap. The extra reaction rail portions are disposed with respect to the running reaction rails so as to be attracted by the opposite pair of magnetic poles of each suspension assembly to that pair normally attracted to the running reaction rails. It can be seen that, when a vehicle fitted with the present suspension assemblies passes through a junction modified with the extra rail portions, the present suspension assemblies continue to provide a levitating force on the vehicle when traversing the gaps in the running reaction rails by acting upon the overlapping extra rail portions. A practical arrangement of reaction rails at a junction for use with the present invention is described later herein.

Normally the structural member extends, in use, substantially in a vertical plane and, then, the electromagnet core portion may be constituted by a single I-shaped core having a web portion in said vertical plane interconnecting upper and lower flange portions, the web portion constituting said common core portion and each said pair of magnetic poles being formed at the outer edges of the upper and lower flange portions on a respective side of the web portion. Preferably, the lower flange portion extends outwardly of the upper flange portion so that the poles in the pair on each side of the web portion are in different vertical planes.

Conveniently, the pole faces are shaped so as, in cooperation with correspondingly shaped reaction rails, to produce, when energised, a transverse component in the levitating force directed outwardly relative to the web portion, the transverse component produced by the pair of poles on one side of the web portion being oppositely directed to that produced by the other.

Independently energisable lateral guidance coils may be wound on the lower flange portion on each side of the web portion, whereby selective energisation of the secondary coils, when the two pairs of poles are attracted to respective reaction rails on both sides of the structural member, causes preferential transverse attraction to one of the rails. This latter facility enables the vehicle fitted with such suspension assemblies to have on board lateral guidance for counteracting external disturbances such as wind gusts and also for route selection at junctions and guidance through the junctions.

Instead of being I-shaped, the single core may be double-U shaped, with the central bar of the double U constituting the common core portion. Then the secondary coils may be wound on the outer bars of the double U.

BRIEF DESCRIPTION OF THE DRAWINGS

FIG. 5 is a diagram illustrating the lift control arrangement on the vehicle;

FIG. 6 illustrates the reaction rail layout at a junction making use of the suspension assembly of the present invention; and FIG. 7 shows diagrammatically the guidance control system on the vehicle.

DESCRIPTION OF THE PREFERRED EMBODIMENTS

Figure 1:
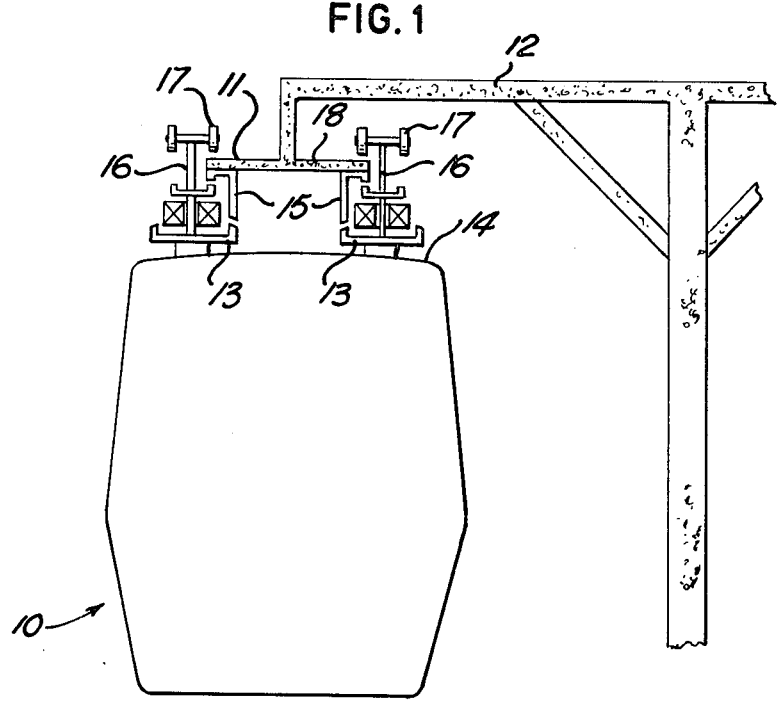
FIG. 1 illustrates suspension assemblies according to the present invention fitted on a vehicle for travelling suspended beneath a track.

Referring to FIG. 1, a vehicle 10, which may, for instance, be a passenger-carrying compartment of a magnetically levitated train, is illustrated suspended beneath a track 11 which is supported on a derrick 12. The vehicle 10 is supported from the track 11 by means of electromagnetic suspension assemblies 13 arranged in pairs symmetrically on either side of the central longitudinal plane of the vehicle. In the figure, one adjacent pair of assemblies 13 are shown fastened laterally spaced apart to the roof 14 of the vehicle 10. The assemblies 13 are arranged to co-operate with a pair of parallel reaction rails 15 extending side by side along the track 11. Extending upwardly on each suspension assembly there is a structural member comprising a suspension member 16, at the top end of which there are mounted a pair of emergency suspension wheels 17. The suspension wheels 17 are disposed to be engageable with an upper surface 18 of the track 11 on dropping of the vehicle 10 from its normal position when suspended by the assemblies 13.

When the assemblies 13 are energised, in a manner to be explained in more detail later herein, they are effective to produce an attractive force on the reaction rails 15 which is effective to levitate the vehicle 10. Means are provided to control the energisation of the assemblies 13 so that there is a stable equilibrium position of the vehicle 10 in which the assemblies 13 support the vehicle 10 out of contact with the rails 15. It will be understood that, if the energisation of the assemblies 13 fails, the vehicle 10 will drop slightly from this equilibrium position until the emergency suspension wheels 17 engage the upper surfaces 18 to prevent the vehicle 10 from falling from the track 11.

Figure 2:
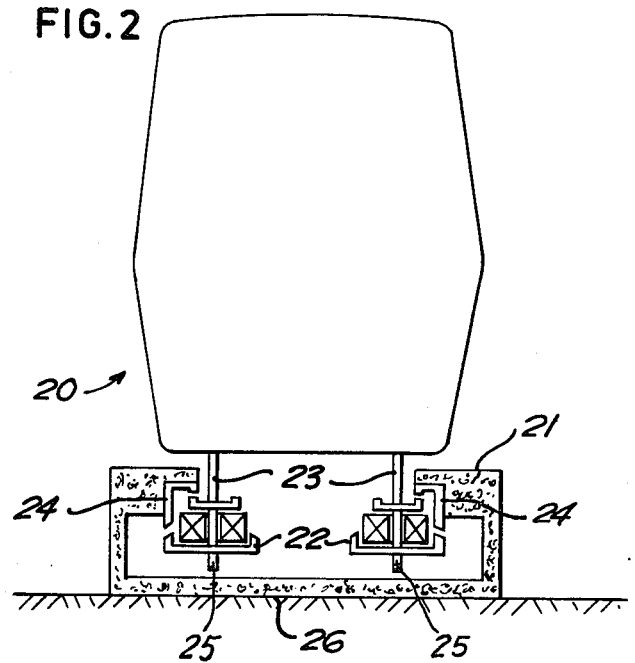
FIG. 2 illustrates the assemblies fitted in a vehicle for travel above a track.

FIG. 2 illustrates a similar arrangement in which the vehicle, reference 20 in this figure, is to travel above the track, reference 21. In this arrangement, the suspension assemblies, reference 22, are mounted beneath the vehicle 20 on respective mounting members 23. The assemblies 22 are, once again, arranged to effect, when energised, an attractive force on reaction rails 24 which run along the track 21. Emergency suspension wheels 25 are provided mounted beneath each suspension assembly 22 to support the vehicle 20 on a base runway 26 of the track 21, in case of failure of the energisation of the assemblies 22.

Figure 3:
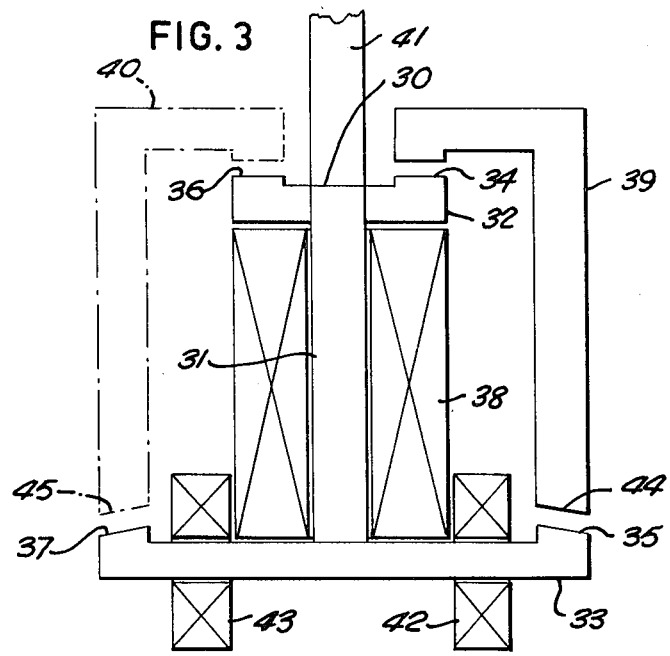
FIGS. 3 and 4 are more detailed representations of suspension assemblies embodying the invention.
Figure 4:
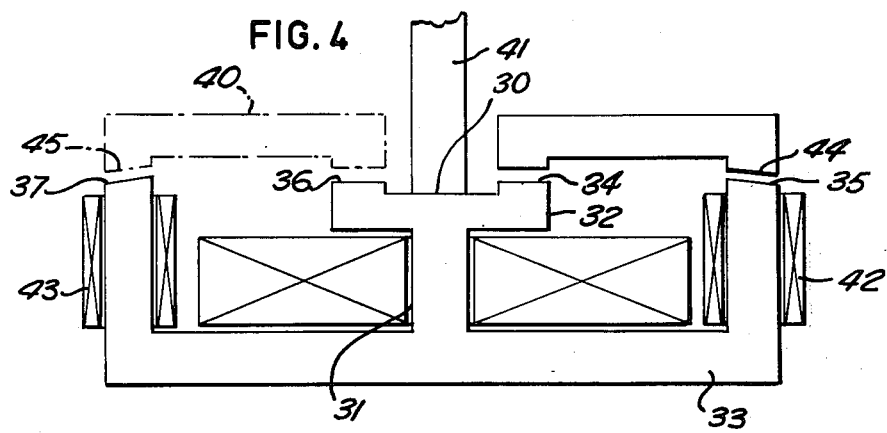

Referring now to FIGS. 3 and 4 the construction and operation of the suspension assemblies 13 can be seen more clearly. FIG. 3 illustrates an I-shaped assembly as shown in FIGS. 1 and 2, and FIG. 4 illustrates a double U-shaped assembly. However, corresponding parts are given like reference numerals in the figures. Each assembly comprises a magnet frame or core formed with a central upright core portion 31 interconnecting an upper transverse core portion 32 and a lower transverse core portion 33. The upright core portion 31, in use, lies substantially in a vertical plane and the assembly is symmetrical on either side of this plane. However, the lower core portion 33 has arms of longer length than the upper portion 32. The magnetic system has, symmetrically disposed on either side of the vertical plane, a pair of magnetic poles 34, 35 and 36, 37 respectively which co-operate with the reaction rail or rails. In the arrangement shown in the figure, the pair of poles 34, 35 are provided at the right-hand outer edges of the upper and lower flange core portions respectively. The pair of poles 36 and 37 are provided at the left-hand outer edges of the flange core portions. The bottom flange 33 extends outwardly of the top flange 32 so that the poles 35 and 37 at the outer edges of the bottom flange 33 are in respective vertical planes spaced from the plane of the web core portion 31 by more than the vertical planes of the poles 34 and 36.

A main energising coil 38 is provided wound about the web core portion 31 and it can be seen that energising this coil 38 effects an attractive magnetic force between the poles 34 and 35 and a reaction rail 39, which is shaped as an inverted L so as to provide in effect, a magnetic short circuit between poles 34 and 35. However, it can also be seen that the energising coil 38 is effective to produce an attractive force between the poles 36, 37 and a reaction rail 40 on the opposite side of the suspension assembly. For normal travel of the vehicle along a portion of track with no junctions, only a single reaction rail is provided and, thus, reaction rail 40 is shown in dotted lines. In general, the flux in the magnetic core 30 generated by the main coil 38 will favour the magnetic circuit containing the poles 34 and 35 when the reaction rail 39 is present, but will favour the circuit containing poles 36 and 37 when reaction rail 40 is present. If both reaction rails 39 and 40 are present the flux will tend to be shared between the two circuits.

The double-U shaped suspension assemblies of FIG. 4 have the advantage of reducing the amount of material necessary for the reaction rails, but at the expense of increased magnet weight.

A portion of a structural member 41 is shown in FIGS. 3 and 4 extending upwardly from the centre of the upper flange core portion 32. The structural member 41 will be constituted either by the suspension member 16 for a vehicle suspended beneath its track or by the support member 23 for a vehicle running above its track. The arrangement of the magnet assembly enables it to provide a levitating force by attraction to a reaction rail on either side of the structural member 41 as indicated by the rails 39 and 40. For controlling the lift, a Hall effect sensor 50 is provided in the magnetic assembly near the junction of the upright core portion 31 with the transverse portion 32 so as to be responsive to the magnitude of the total flux. The control system is illustrated diagrammatically in FIG. 5. The Hall plate 50 is energised by a current $i$ derived from a source to be described later and it thus produces an output voltage proportional to $Bi$ where $B$ is the magnetic flux. This signal is compared in an amplifier 51 with a feedback signal proportional to the current $I$ through the coil 38 of the electromagnet, this voltage being obtained from a resistor 55 in series with coil 38. The amplifier 51 is a high gain amplifier which amplifies the difference of the two inputs to provide an output voltage $v$. This output voltage is applied via a resistor 52 to give the aforementioned Hall plate current $i$ and is also fed to a power amplifier 53 where it is summed with a reference signal on lead 54 representing the required spacing of the vehicle from the reaction rail, the difference signal being amplified by the amplifier 53 to provide the coil current $I$ for the coil 38.

Since the amplifier 51 is a high gain amplifier, the circuit operates so that the signal proportional to $Bi$ from the Hall plate 50 is kept equal to the feedback signal from the coil 38, which latter signal is $KI$ where $K$ is a constant. In the magnetic circuit, the magnetic induction $B$ is proportional to the magnetomotive force (which is proportional to $I$) and is inversely proportional to the length $\chi$ of the air gap, assuming that this is the major source of reluctance in the magnetic circuit. Thus $B$ is proportional to $I/\chi$. However, as explained above, the circuit ensures that $Bi = KI$. Therefore $i$ is proportional to $\chi$. Thus, if a reference signal is applied to lead 54, the current flowing in the coil 38 is controlled by amplifier 53 to maintain the value of $\chi$ at the required value. The amplifier 53 forms a controller which, in the known way, may be arranged to include derivative and/or integral control. Lead and lag compensation may be applied in the known manner to maintain feedback stability.

FIG. 6 illustrates a junction in a track for a vehicle employing the above-described magnet assemblies for magnetic levitation. In FIG. 6, there is shown a spur track 60 curving off a straight track portion 61. The solid lines in FIG. 6 indicate the positions of reaction rails and in the arrangement illustrated a vehicle is supported, when running along junction-free track, by the magnetic attraction to corresponding reaction rails of the inner magnetic poles of suspension assemblies mounted on the vehicle in laterally spaced pairs. Thus, for normal running of the vehicle on junction-free track the structural members 41, i.e. support members 23 or suspension member 16, extend upwardly past the reaction rails but on the outer sides thereof with respect to the track.

If a vehicle approaching the junction in the direction of arrow 62 on the straight track portion 61 is to turn off onto the spur 60 it is necessary for the structural member 41 of the suspension assemblies acting on the left-hand reaction rail to pass through a gap 63 provided in the left-hand rail of the straight track portion 61. Conversely, for a vehicle continuing straight on through the junction in the direction of arrow 62, the structural members 41 of the suspension assemblies acting on the right-hand reaction rail pass through a gap 64 in the beginning of the right-hand rail of the spur 60. Gaps are also necessary in the right-hand rail of the straight track portion and the left-hand rail of the spur at the crossing point 65 of these two rails. In order that a vehicle travelling through the junction can maintain suspension across the gaps 63, 64 and the cross-over 65 overlapping rail portions 66, 67, 68 and 69 are provided. The rail portion 66 is provided extending parallel with and outside of the left-hand rail of the straight track portion 61 to overlap at each end of the gap 63. The portion 67 is provided extending parallel with the righthand rail of the spur 60 and overlapping the gap 64. The portions 68 and 69 are provided parallel respectively with the right-hand rail of the straight track portion 62 and the left-hand rail of the spur 60 substantially to overlap the gaps in these rails at the cross-over 65. In each case, the overlapping rail portions are spaced outside the rail, the gap in which they overlap, so as to co-operate with the outer magnetic poles of the suspension assemblies acting on the respective rail. Thus, as a vehicle travels through the junction suspension is maintained as the suspension assemblies traverse gaps in the main running reaction rails by virtue of the attraction of the suspension assemblies to the overlapping rail portions.

Referring again to FIG. 3, the poles 35 and 37 at each edge of the lower flange 33 are bevelled to slope downwardly and outwardly relative to the web core portion 31. The shaping of poles 35 and 37, in co-operation with correspondingly-shaped edges 44 and 45 of the reaction rails 39 and 40 is effective to produce a component of the attractive force between poles 35 and 37 and the respective reaction rails in an horizontal transverse direction relative to the rails. The transverse components produced by the poles 35 and 37 act in opposite directions so that the component produced by the pole 35 on the rail 39 tends to attract the suspension assembly to the right, as shown in FIG. 3, whereas that produced by the pole 37 on the rail 40 tends to pull the assembly to the left.

Poles 35 and 37 of the double-U shaped assemblies of FIG. 4 are similarly bevelled.

An auxiliary energising coil 42 is wound about the right-hand part of the lower flange 33 and a corresponding coil 43 is wound about the left-hand part thereof. Selective energisation of these auxiliary coils causes the energisation of the corresponding magnetic circuit of the suspension assembly to be increased or decreased relative to the other. Thus, when the assembly is acting on reaction rails on both sides, such as at the beginning of a track junction, it is possible to produce a preferential transverse attraction of the suspension assembly to one or other of the two rails by energising one or other of the auxiliary coils 42 and 43. With this facility, it is possible for a vehicle fitted with the suspension assemblies of FIG. 3 to have on board control of route switching at track junctions.

Control of the vehicle in passing through the track junction is obtained by appropriate sequential energisation of the lateral guidance coils 42, 43 of the electromagnet. It is convenient, in referring to FIG. 6, to consider guidance as being from a left-hand (LH) or right hand (RH) side guide rail. The appropriate guide rail is made effective for guidance by selectively energising the appropriate one of coils 42, 43. For a vehicle going straight through in the direction of the arrow 62, the sequence of coil energisation is shown in the following table.

At AA':
  L.H. side outer rail
  R.H. side inner rail
At BB':
  L.H. side outer rail
  R.H. side outer rail
At CC':
  L.H. side inner rail
  R.H. side inner rail For a vehicle turning off onto the spur track 60, the sequence of energisation is as follows:
At AA':
  L.H. side inner rail
  R.H. side outer rail
At BB':
  L.H. side inner rail
  R.H. side inner rail The sequential operation may be effected automatically as illustrated in FIG. 7. At the locations AA', BB' and CC' of FIG. 6, markers are provided which can be distinctively sensed by a sensor on the vehicle. The sensing may be mechanical or optical or electrical, the requirement being to provide, on the vehicle, a signal when the vehicle reaches that position along the track. These markers are indicated at 70 on FIG. 6. The sensor 71 in FIG. 1 provides a control signal to a sequence controller 72. The sensor 71 may comprise independent sensing means for each of the markers. The sequence controller 72 has a manually settable knob 73 enabling selection of one or other of the two sequences set out in the tables above and operates appropriately switches for energising the coils 42, 43 of the left-hand and right-hand suspension units 75, 76 from a power source 77.

A particular advantage of the asymmetrical magnet construction, i.e. having longer horizontal arms at the bottom than at the top, is that the differential leakage fluxes around the lower pole tips introduce a velocity damping term into the lateral magnetic restoring force.

I claim:

1. An electromagnetic suspension system for a vehicle to be levitated by magnetic attraction comprising an electromagnetic core on the vehicle having an upright core portion with upper arms extending outwardly from the top of said upright core portion and lower arms extending outwardly from the bottom of said upright core portion, the lower arms being longer than the upper arms, the upper arms having, at their outer ends, horizontal upwardly facing pole faces, and the lower arms, at their outer ends, each having a pole face sloping at an angle to the horizontal; and, for supporting the vehicle, a ferro-magnetic reaction rail on at least one side of said core and having a horizontal top portion extending inwardly from the upper end of a vertical side portion, thereby forming an inverted L-shaped structure when considered in transverse section, said horizontal top portion extending inwardly towards said core from the upper end of said vertical side portion, said horizontal top portion having, at its inner end, a downwardly facing horizontal pole face which, with one of said upwardly facing pole faces, defines a first air gap, said vertical side portion having, at its lower end, a pole face sloping at an angle to the horizontal which pole face, with the aforesaid pole face on one of said lower arms, defines a second air gap; a main lift winding on said upright portion of the core, means for energising said main lift winding to provide magnetic flux across said first air gap for giving a vertical support force on said core, lateral guidance windings on each of said lower arms of the core and means for selectively energizing said lateral guidance windings.

2. An electromagnetic suspension system as claimed in claim 1 wherein a flux sensor is provided for sensing the flux in said upright portion of the core and control means are provided on the vehicle for controlling the energisation of the main winding in accordance with the sensed flux to control the lift.

3. An electromagnetic suspension system as claimed in claim 2 wherein the flux sensor is a Hall effect device.

4. An electromagnetic suspension system as claimed in claim 3 wherein the flux sensor is at the junction of the upright portion of the core with the upper arms.

5. An electromagnetic suspension system as claimed in claim 1, wherein, at a track junction, two reaction rails are provided, one reaction rail being located on one side and the other reaction rail being located on the other side of said electromagnetic core, the two reaction rails diverging along different paths and wherein means are provided for automatically controlling said means for selectively energising of the lateral guidance windings, as the vehicle moves along the tracks, to constrain the vehicle to follow a selected path.

6. A transport system having an electromagnetic suspension system for a vehicle to be levitated by magnetic attraction comprising an electromagnetic core on the vehicle having an upright core portion with first and second upper arms extending outwardly in opposite directions from the top of said upright core portion and first and second lower arms extending outwardly in opposite directions from the bottom of said upright core portion, the lower arms being longer than the upper arms, the upper arms having, at their outer ends, horizontal upwardly facing pole faces, and the lower arms, at their outer ends, each having a pole face sloping at an angle to the horizontal; and, for supporting the vehicle, a first ferro-magnetic reaction rail on one side of said core and having a horizontal top portion extending inwardly from the upper end of a vertical side portion, thereby forming an inverted L-shaped structure when considered in transverse section, said horizontal top portion extending inwardly towards said core from the upper end of said vertical side portion, said horizontal top portion having, at its inner end, a downwardly facing, horizontal pole face which, with said upwardly facing pole face on said first upper arm defines a first air gap, said vertical side portion having, at its lower end, a pole face sloping at an angle to the horizontal which pole face, with the aforesaid pole face on the first lower arm, defines a second air gap; a main lift winding on said upright portion of the core, means for energising said main lift winding to provide flux across said first air gap for giving a vertical support force on said core, lateral guidance windings on each of said lower arms of the core, and wherein, at least at a track junction, a second ferromagnetic reaction rail is provided on the opposite side of said core to the first reaction rail, the second reaction rail having a horizontal top portion with, at its inner end, a downwardly facing pole face which, with the upwardly facing pole face on said second upper arm defines a third air gap, said second reaction rail furthermore having a side portion extending downwardly from the top portion, which side portion, at its lower end, has a pole face sloping at an angle to the horizontal to define with the pole face on the second lower arm defines a fourth air gap, and wherein means are provided for selectively energising said lateral guidance windings, as the vehicle moves along the track, to constrain the vehicle to follow a selected path at a track junction.

7. A transport system as claimed in claim 6 wherein a flux sensor is provided for sensing the flux in the upright portion of the core and control means are provided on the vehicle for controlling the energisation of the main winding in accordance with the sensed flux to control the lift.

8. A transport system as claimed in claim 6, wherein a second electromagnetic core is provided on the vehicle and wherein the track includes at least one further ferro-magnetic reaction rail cooperating with said second core.

* * * * *